United States Patent Office 2,827,173
Patented Mar. 18, 1958

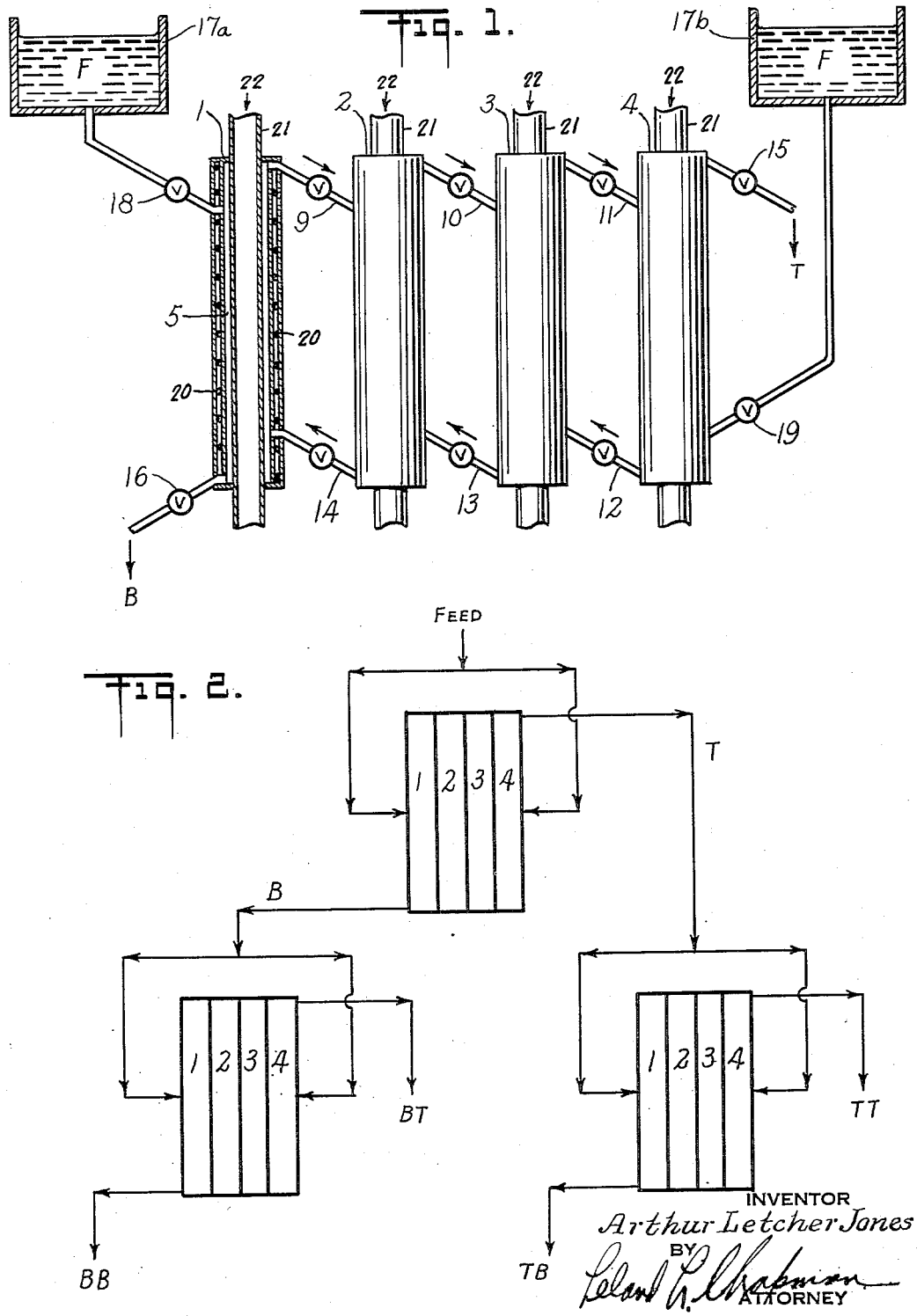

2,827,173

THERMAL DIFFUSION APPARATUS AND METHOD

Arthur Letcher Jones, Lyndhurst, Ohio, assignor to The Standard Oil Company, Cleveland, Ohio, a corporation of Ohio Application March 28, 1957, Serial No. 649,157

12 Claims. (Cl. 210—72)

This invention relates to a liquid thermal diffusion apparatus and method that has particular value as a laboratory tool for separating liquid mixtures into dissimilar fractions without undergoing a change of phase.

Liquid thermal diffusion, as described for example in Patents 2,541,069-71 to Jones and Hughes, is accomplished by imposing a temperature gradient across a thin layer or film of liquid mixture. To do this, a liquid mixture is confined in or passed through a thermal diffusion separation chamber defined by closely spaced wall members, one of which is relatively heated and referred to as the "hot wall" and the other of which is relatively cooled and referred to as the "cold wall." It is believed that the temperature gradient across the liquid in a thermal diffusion separation chamber imparts to unassociated molecules of liquid varying amounts of energy, due to absorption of heat from the hot wall. The amount of this energy which is transformed into or utilized as kinetic energy of translation appears to depend more upon the structure than upon the size of the molecules with the result that some molecules acquire a higher kinetic energy of translation and tend to move away from the hot wall than others which acquire lesser kinetic energy of translation and tend to be displaced toward the hot wall. When a thermal diffusion separation chamber is vertical or has a vertical component, a convection current is set up within the chamber, the fraction preferentially accumulating adjacent the hot wall, referred to generally as the "hot wall fraction" or "top fraction," ascends along the hot wall and the fraction preferentially accumulating adjacent the cold wall, referred to generally as the "cold wall fraction" or "bottom fraction," descends along the cold wall, thus setting up a concentration gradient across and lengthwise of the separation chamber.

It has been proposed heretofore in Patent 2,742,154 to Jones and Milberger to provide a thermal diffusion apparatus and method designed particularly for laboratory use. The apparatus essentially comprises a separation chamber defined by chamber-forming walls preferably spaced apart no more than about 0.15" and preferably less than 0.015" that is provided with withdrawal ports spaced vertically along the column. In operation, this apparatus is filled with the liquid to be separated, the walls are relatively heated and cooled until a concentration gradient is established in the liquid and reaches or substantially reaches equilibrium conditions, whereupon the separated fractions are successively and separately removed, beginning with the top fraction and finally ending with removal of the bottom fraction.

The apparatus referred to has become most useful and, considering the fact that liquid thermal diffusion was little more than a laboratory curiosity until only about ten years ago, has received enthusiastic acceptance in the art as a research tool. In many types of research, however, it is desirable to obtain the fractions separated in larger volume than has been considered possible in the static thermal diffusion column referred to. Also, it is often not necessary or desirable to separate intermediate fractions, i. e., intermediate between the extreme top and extreme bottom fractions.

It has now been found that remarkably superior results are obtainable by a series of at least two thermal diffusion columns. The separation chamber in each of the columns comprises an upper zone, a lower zone and an intermediate zone. Conduit means are provided between the chambers for connecting the top of the upper zone of every chamber except the last with the bottom of the upper zone of the next succeeding chamber in the series. Second conduit means are likewise provided between the chambers for connecting the bottom of the lower zone of every chamber except the first with the top of the lower zone of the next preceding chamber in the series. Valved means are provided for introducing liquid mixture into the first in the series of chambers, displacing the hot wall or top fraction accumulated in the upper zone of the first chamber to the upper zone of the second, and displacing the top fraction accumulated in the upper zone of the second chamber to the upper zone of the third and so on, the top fraction in the upper zone of the last chamber being withdrawn as the "hot wall" or "top" fraction. Valved means are also provided for introducing liquid mixture into the last in the series of chambers and for displacing the cold wall or bottom fraction accumulated in the lower zone of the last chamber to the lower zone of the next preceding chamber and so on, the fraction accumulated in the lower zone of the first chamber being displaced and withdrawn as the "cold wall" or "bottom" fraction.

In operating the apparatus of the invention, the various chambers are filled with liquid mixture and the hot and cold walls are relatively heated and cooled to impose a temperature gradient across the mixture. While this is being done, valves in the conduit means connecting the upper zones, or the valves in the conduit means connecting the lower zones, and one of the valves connecting the first or last chamber in the series to a source of liquid mixture are closed. The purpose of this is to avoid convection of liquid among the columns and to allow for a change in volume of the liquid during the operation.

To withdraw a top or hot wall fraction, the valves in the conduits connecting the upper zones and the valve in the conduit from a source of liquid mixture to the first chamber are opened, all other valves being closed, for a time sufficient to introduce into the first chamber and to displace from the upper zone of each chamber to the next and from the last, a volume of liquid approximately equal to the volume of liquid in the upper zone of the last chamber in the series. This is the top fraction. The opened valves are then closed and the remaining valves are opened to introduce liquid mixture into the last chamber, thereby displacing the fraction accumulated in the lower zone of the last chamber into the lower zone of the next preceding chamber and so on, and ultimately displacing the cold wall or bottom fraction from the lower zone of the first chamber, the volume of liquid mixture introduced into the last chamber being approximately equal to the volume of the cold wall fraction in the lower zone of the first chamber.

The frequency with which liquid can be introduced and fractions withdrawn for optimum separation depends upon the length of time required to achieve equilibrium conditions with a given starting mixture under such operating conditions as temperature gradient, and is directly proportional to the number of columns in the series. Thus, if equilibrium conditions in the form of substantially constant concentration gradients within the chambers are obtained after four days, top and bottom fractions may be withdrawn daily with a battery of four columns, twice daily with a battery of eight, or every other day with only two columns for optimum separation.

It will become apparent from a consideration of the method of operation that by the transverse displacement of top fractions from one upper zone to the next and of countercurrent transverse displacement of bottom fractions from one lower zone to the next preceding zone, that an extra step of countercurrent is introduced into the flow system. This results in greater composition differences at the opposite zones, i. e., the upper zone of the last column and the lower zone of the first column, than would be possible between upper and lower zones in a single column that is not interconnected in the manner described even though operated the same length of time under otherwise identical conditions.

In the preferred embodiments of the invention, the upper and lower zones form the upper and lower portions, respectively, of the separation chambers, i. e., the walls defining the zones and the chambers are closely and substantially equidistantly spaced apart. It is within the scope of the invention, however, intermittently to feed liquid mixture to columns or vessels comprising separation chambers and having upper and lower zones which, because of greater wall spacings than in the separation chambers, act as reservoirs for fractions preferentially accumulating therein.

It is also within the scope of the invention to conduct thermal diffusion separations in two or more stages to obtain still greater separations. This will be demonstrated in an example of a specific embodiment.

One important advantage of the apparatus and method of the invention is that any desired quantity of highly separated material may be obtained without having to empty and refill the columns. Another is there is no necessity for handling any intermediate fractions formed between the upper and lower zones. Another advantage, particularly over continuous thermal diffusion apparatus and methods, is that no rate control devices need be employed. Perhaps the most important advantage, already alluded to, is that the degree of separation obtainable is considerably greater than is possible with a single column.

One important advantage of the method of the invention is that it makes possible a most efficient use of thermal diffusion separation columns that have hitherto been regarded, because of the absence of reservoirs at the top and bottom, as suitable only for static operation. With this method, the absence of reservoirs of enlarged area is an advantage. It is to be understood, however, that columns having upper and lower reservoirs can also be operated in the manner described.

The advantages and utility of the apparatus and method of the invention will become further apparent from the following example describing the best mode now contemplated for carrying out the invention, this example being made with reference to the accompanying drawing wherein:

Figure 1 is a schematic representation of apparatus embodying the invention; and Figure 2 is a diagrammatic representation showing a two-stage flow pattern utilized in the specific example.

Referring now to Figure 1, the columns marked 1, 2, 3 and 4 illustrate a series of four thermal diffusion columns comprising vertical concentric tubes 21 forming annular separation chambers 5. The inner tubes are relatively cooled, e. g., by movement therethrough of a cooling agent as indicated by the arrows 22, and the outer tubes are relatively heated, e. g., by means of electrical resistance wire 20 or the like, as indicated schematically. The upper ends of the annular chambers 5 are interconnected as shown by valved conduit means 9, 10 and 11. The lower ends of the separation chambers are similarly connected by valved conduit means 12, 13 and 14.

Valved outlets are provided at 15 for withdrawing a hot wall or top fraction and at 16 for withdrawing a cold wall or bottom fraction from the last and first separation chambers in the series. Reservoirs 17a and 17b and lines carrying valves 18 and 19 are provided for feeding liquid mixture to the apparatus, the line carrying valve 18 being adapted to introduce fresh liquid mixture into the separation chamber of the first column and the other being adapted to introduce fresh liquid mixture into the separation chamber of the last column.

To operate the apparatus illustrated in Figure 1, all valves shown except valves 15 and 16 are opened and the columns and conduits are filled with liquid mixture from reservoirs 17a and 17b. The valves in the upper connecting conduits 9, 10 and 11 are then closed and either one of the valves 18 and 19 in the lines communicating with the reservoirs is closed. The walls of the separation chamber are then relatively heated and cooled and the assembly is allowed to stand for a preselected period of time. The closed valves in the upper lines prevent thermo-syphoning between columns while at the same time the liquid in the entire system is free to expand or contract in response to temperature changes by virtue of the fact that one of the valves 18 and 19 is open.

To remove a sample of top fraction, all the lower valves in lines 12, 13 and 14 are closed and valve 19, if not already closed, is likewise closed. Valves 15 and 18, and the valves in lines 9, 10 and 11 are then opened. The last of these to be opened causes fresh liquid mixture from reservoir 17a to enter the chamber 5 of column 1 and displace the top fraction in the upper zone of the chamber through line 9. This in turn displaces the top fraction in the upper zone of the chamber in the next column 2 through line 10 and so on until the top fraction in the upper zone of the chamber in the last column 4 is removed, as product T, through the product withdrawal line carrying valve 15. With all the valves at the top, i. e., valves 15 and 18, and the valves in lines 9, 10 and 11 now closed, a bottom sample is similarly removed through valve 16. Fresh liquid mixture from reservoir 17b entering the chamber of the last column 4, displaces the cold wall fraction in the lower zone thereof through line 12, to, in turn, displace the cold wall fraction in the lower zone of the chamber of the next preceding column 3 and so on until the bottom fraction in the lower zone of the chamber 5 in the first column 1 is removed.

The columns shown in Patent 2,742,154 can be connected using the uppermost and lowermost outlets for connections to the top and bottom respectively of the upper and lower zones, and the next adjacent outlet for connections to the bottom and top respectively of the upper and lower zones.

The frequency of removing such samples is preferably determined from the length of time required for a steady state to be reached with the particular liquid mixture being processed. If a steady state is reached in four days and a battery of four columns is employed, optimum separations are obtained by daily withdrawals because each sample removed will then have resided in the system for four days. Two columns should be sampled half as often as four for optimum separation.

*Example*

A light, solvent-extracted neutral oil of mid-Continent origin, having a viscosity of 140 SUS at 100° F. and a viscosity index of 95, was subjected to thermal diffusion in the apparatus illustrated in Figure 1. Each of the columns had a total volume of 30 cc. and the upper and lower zones thereof had volumes of 3 cc. each. The cold walls were relatively cooled to a temperature of about 65° F. and the hot walls were maintained at a temperature of 200° F. The slit width was 0.0115″.

3 cc. samples of top and bottom fractions T and B were removed every twenty-four hours through valves 15 and 16 until approximately 200 cc. of each of the two fractions were collected. The top product had a viscosity index of 125 and the bottom product had a viscosity index of 30.

These products were then reprocessed in a second stage as indicated schematically in Figure 2, the fraction T being reprocessed in the same four columns and in the same manner to produce 40 cc. each of a second top fraction TT and a bottom fraction TB. In the same way, the bottom fraction B was subjected to thermal diffusion in the same four separation chambers to produce 40 cc. each of a top fraction BT and a second bottom fraction BB.

The results, in terms of comparison of refractive index and volume percent of open chain paraffin, cyclized paraffins and aromatics, are summarized in the following table:

| Fraction | Volume Percent | | | | | | | | Refractive Index, $n_D^{25}$ |
| --- | --- | --- | --- | --- | --- | --- | --- | --- | --- |
| | Paraffins | Cycloparaffins | | | | | | Aromatics | |
| | | Mono- | Di- | Tri- | Tetra- | Penta- | Hexa- | | |
| Feed | 14 | 30 | 20 | 11 | 9 | 6 | 4 | 6 | 1.4725 |
| 1st Stage, Top T | 32 | 42 | 14 | 3 | 2 | 2 | 1 | 4 | 1.4600 |
| 1st Stage, Bottom B | 3 | 21 | 26 | 16 | 13 | 7 | 6 | 8 | 1.4900 |
| 2nd Stage, Top TT | 46 | 43 | 5 | <1 | <1 | <1 | <1 | 4 | 1.4540 |
| 2nd Stage, Bottom BB | 0 | 12 | 22 | 18 | 18 | 10 | 9 | 11 | 1.5000 |

It is apparent from the data in the table above that the separation of hydrocarbon-types, as determined by mass spectrometer analysis, is quite spectacular and represents convincing evidence of the utility of the method and apparatus embodying the invention in separating materials on the basis of difference in molecular structure. The condensed ring cycloparaffins have a strong tendency to concentrate in the bottom fractions while the paraffins and monocyclicparaffins tend to concentrate in the top fractions.

It also shows the wide degree of separation, as indicated by refractive index, that is obtainable with the apparatus and method embodying the invention. Thus, for example, the difference in refractive index between the top and bottom fractions at the end of the first stage is $300 \times 10^{-4}$; whereas, the maximum separations obtainable with a single column under the same conditions is only $167 \times 10^{-4}$, an increase of 80% in the degree of separation. Furthermore, the difference in index of refraction between the top fraction TT of the second stage and the bottom fraction BB of the second stage is $460 \times 10^{-4}$, a degree of separation believed to be hitherto unobtainable, particularly in volumes of the kind here involved.

It is to be expected that numerous modifications will readily become apparent to those skilled in the art upon reading this description. All such modifications are intended to be included within the scope of the invention as defined in the appended claims.

I claim:

1. Apparatus for separating a liquid mixture into dissimilar hot and cold wall fractions which comprises a series of vessels each comprising closely spaced wall members forming a substantially vertical liquid thermal diffusion separation chamber and having an upper zone and a lower zone; means for relatively heating and cooling the opposed chamber-forming wall members for providing a relatively hot wall and a relatively cold wall for each separation chamber in the series; first conduit means between the vessels connecting the tops of the upper zones of every vessel except the last with the bottoms of the upper zones of the next succeeding vessels in the series; means for opening and closing said first conduit means; a first product withdrawal line for removing a hot wall fraction from the top of the upper zone in the last vessel; second conduit means between the vessels connecting the bottoms of the lower zones of every vessel except the first with the tops of the lower zones of the next preceding vessels in the series; means for opening and closing said second conduit means; a second product withdrawal line for removing a cold wall fraction from the bottom of the lower zone in the first vessel; means communicating with a source of liquid mixture for intermittently introducing it into the upper zone of the first vessel whereby when said first conduit means is open liquid is displaced from the upper zones in the vessels through said first conduit means into the upper zones in the next succeeding vessels in the series and a hot wall fraction from the upper zone of the last vessel in the series is displaced; and means communicating with a source of liquid mixture for intermittently introducing it into the lower zone of the last vessel whereby when said second conduit means is open liquid is displaced from the bottoms of the lower zones in the vessels through the second conduit means into the lower zones in the next preceding vessels in the series and a cold wall fraction from the bottom of the lower zone in the first vessel is displaced.

2. Apparatus for separating a liquid mixture into dissimilar hot and cold wall fractions which comprises a series of vessels each comprising closely and equidistantly spaced wall members forming a substantially vertical liquid thermal diffusion separation chamber having upper and lower ends, an upper zone, a lower zone and an intermediate zone; means for relatively heating and cooling the opposed chamber-forming wall members for providing a relatively hot wall and a relatively cold wall for each separation chamber in the series; first conduit means between the chambers connecting the tops of the upper zones of every chamber except the last chamber with the bottoms of the upper zones of the next succeeding chambers in the series; means for opening and closing said first conduit means; second conduit means between the chambers connecting the bottoms of the lower zones of every chamber except the first chamber with the tops of the lower zones of the next preceding chambers in the series; means for opening and closing said second conduit means; means communicating with a source of liquid mixture for intermittently introducing it into the first chamber intermediate the upper and lower ends thereof whereby when said first conduit means is open liquid is displaced from the upper zones of the chambers through said first conduit means into the upper zones of next succeeding chambers in the series and a hot wall fraction from the upper zone of the last chamber in the series is displaced; means communicating with a source of liquid mixture for intermittently introducing it into the last chamber intermediate the upper and lower ends thereof whereby when said second conduit means is open liquid is displaced from the lower zones of the chambers through the second conduit means into the lower zones in the next preceding chambers in the series and a cold wall fraction from the bottom of the lower zone in the first chamber is displaced.

3. Apparatus for separating a liquid mixture into dissimilar hot and cold wall fractions which comprises a series of vessels each comprising closely and equidistantly spaced wall members forming a substantially vertical liquid thermal diffusion separation chamber having upper and lower ends, an upper zone, a lower zone and an intermediate zone; means for relatively heating and cooling the opposed chamber-forming wall members for providing a relatively hot wall and a relatively cold wall for each separation chamber in the series; first valved conduit means between the chambers connecting the tops of the upper zones of every chamber except the last chamber with the bottoms of the upper zones of the next succeeding chambers in the series; second valved conduit means between the chambers connecting the bottoms of the lower zones of every chamber except the first chamber with the tops of the lower zones of the next preceding chambers in the series; valved means communicating with a source of liquid mixture for intermittently introducing it into the first chamber intermediate the upper and lower ends thereof whereby when the valves in said first conduit means are open liquid is displaced from the upper zones of the chambers through said first conduit means into the upper zones of next succeeding chambers in the series and a hot wall fraction from the upper zone of the last chamber in the series is displaced; valved means communicating with a source of liquid mixture for intermittently introducing it into the last chamber intermediate the upper and lower ends thereof whereby when the valves in said second conduit means are open liquid is displaced from the lower zones of the chambers through the second conduit means into the lower zones in the next preceding chambers in the series and a cold wall fraction from the bottom of the lower zone in the first chamber is displaced.

4. Apparatus for separating a liquid mixture into dissimilar hot and cold wall fractions which comprises a series of vessels each comprising closely and equidistantly spaced wall members forming a substantially vertical liquid thermal diffusion separation chamber having upper and lower ends, an upper zone, a lower zone and an intermediate zone; means for relatively heating and cooling the opposed chamber-forming wall members for providing a relatively hot wall and a relatively cold wall for each separation chamber in the series; first valved conduit means between the chambers connecting the tops of the upper zones of every chamber except the last chamber with the bottoms of the upper zones of the next succeeding chambers in the series; a first product withdrawal line for removing a hot wall fraction from the top of the upper zone in the last chamber; second valved conduit means between the chambers connecting the bottoms of the lower zones of every chamber except the first chamber with the tops of the lower zones of the next preceding chambers in the series; a second product withdrawal line for removing a cold wall fraction from the bottom of the lower zone in the first chamber; valved means communicating with a source of liquid mixture for intermittently introducing it into the first chamber intermediate the upper and lower ends thereof whereby when the valves in said first conduit means are open liquid is displaced from the upper zones of the chambers through said first conduit means into the upper zones of the next succeeding chambers in the series and a hot wall fraction through the first product withdrawal line is displaced; valved means communicating with a source of liquid mixture for intermittently introducing it into the last chamber intermediate the upper and lower ends thereof whereby when the valves in said second conduit means are open liquid is displaced from the lower zones of the chambers through the second conduit means into the lower zones in the next preceding chambers in the series and a cold wall fraction through the second product withdrawal line is displaced.

5. Apparatus defined in claim 4 wherein the chamber-forming wall members are concentric tubes.

6. Apparatus defined in claim 4 wherein the upper and lower zones have volumes comprising a minor fraction of the total volume of the separation chambers.

7. Apparatus defined in claim 4 wherein the upper and lower zones have volumes each comprising approximately one-tenth the total volume of the separation chamber.

8. Apparatus for separating a liquid mixture into dissimilar hot and cold wall fractions which comprises a series of four vessels each comprising closely and equidistantly spaced wall members forming a substantially vertical liquid thermal diffusion separation chamber having upper and lower ends, an upper zone, a lower zone and an intermediate zone; means for relatively heating and cooling the opposed chamber-forming wall members for providing a relatively hot wall and a relatively cold wall for each separation chamber in the series; first valved conduit means between the chambers connecting the tops of the upper zones of the first, second and third chambers with the bottoms of the upper zones in the second, third and fourth chambers, respectively; second valved conduit means between the chambers connecting the bottoms of the lower zones of the second, third and fourth chambers with the tops of the lower zones in the first, second and third chambers, respectively; valved means communicating with a source of liquid mixture for intermittently introducing it into the first chamber intermediate the upper and lower ends thereof whereby when the valves in said first conduit means are open liquid is displaced from the upper zones of the first, second and third chambers through said first conduit means into the upper zones of the second, third and fourth chambers, respectively, and a hot wall fraction from the top of the upper zone of the fourth chamber is displaced; and valved means communicating with a source of liquid mixture for intermittently introducing it into the fourth chamber intermediate the upper and lower ends thereof whereby when the valves in said second conduit means are open liquid is displaced from the lower zones of the fourth, third and second chambers through the second conduit means into the lower zones in the third, second and first chambers, respectively, and a cold wall fraction from the bottom of the lower zone in the first chamber is displaced.

9. Apparatus defined in claim 8 wherein the chamber-forming wall members are concentric tubes.

10. Liquid thermal diffusion method which comprises confining a liquid mixture in a series of vessels having separation chambers and adjacent upper and lower zones, said separation chambers being defined by closely spaced wall members; maintaining one of the wall members in each chamber at a higher temperature than the other wall member in each chamber for separating the mixture into dissimilar fractions, one fraction accumulating preferentially adjacent one of the wall members and ascending to the upper zones and the other fraction accumulating preferentially adjacent the other walls and descending to the lower zones; intermittently introducing fresh liquid mixture into the upper zone of the first of the series of vessels and simultaneously transferring the fractions preferentially accumulated in each of the upper zones into the next in the series of upper zones and simultaneously withdrawing the fraction in the upper zone of the last in the series of chambers; and intermittently introducing fresh liquid mixture into the lower zone of the last of the series of vessels and simultaneously transferring the fractions preferentially accumulated in each of the lower zones into the next preceding lower zone in the series and simultaneously withdrawing the fraction accumulated in the lower zone of the first in the series of chambers.

11. Liquid thermal diffusion method which comprises confining a liquid mixture in a series of separation chambers defined by closely and equidistantly spaced wall members and having upper, lower and intermediate zones; maintaining one of the wall members in each chamber at a higher temperature than the other wall member in each chamber for separating the mixture into dissimilar fractions, one fraction accumulating preferentially adjacent one of the wall members and ascending to the upper zones and the other fraction accumulating preferentially adjacent the other wall member and descending to the lower zones; introducing into the upper zone of the first of the series of separation chambers an amount of fresh liquid mixture equal in volume to the volume of the upper zone of the last in the series of separation chambers and simultaneously transferring the fractions preferentially accumulated in each of the upper zones into the next in the series of upper zones and simultaneously withdrawing the fraction in the upper zone of the last in the series of chambers; and introducing into the lower zone of the last of the series of separation chambers an amount of fresh liquid mixture equal in volume to the total volume of the lower zone of the first in the series of separation chambers and simultaneously transferring the fractions preferentially accumulated in each of the lower zones into the next preceding lower zones in the series and simultaneously withdrawing the fraction accumulated in the lower zone of the first in the series of chambers.

12. Method defined in claim 11 wherein fresh liquid mixture is introduced intermittently into the first and last in the series of separation chambers, the frequency of the intermittent introduction being approximately equal to the time required for establishing substantially constant concentration gradients within the separation chambers divided by the number of separation chambers.

References Cited in the file of this patent

UNITED STATES PATENTS

| | | |
|---|---|---|
| 2,541,071 | Jones et al. | Feb. 13, 1951 |
| 2,723,033 | Jones et al. | Nov. 8, 1955 |
| 2,723,034 | Jones | Nov. 8, 1955 |
| 2,767,850 | Marsh | Oct. 23, 1956 |